Jan. 13, 1959     O. C. ROBBINS     2,868,043
PORTABLE HORIZONTAL DRILL
Filed May 20, 1957     2 Sheets-Sheet 1
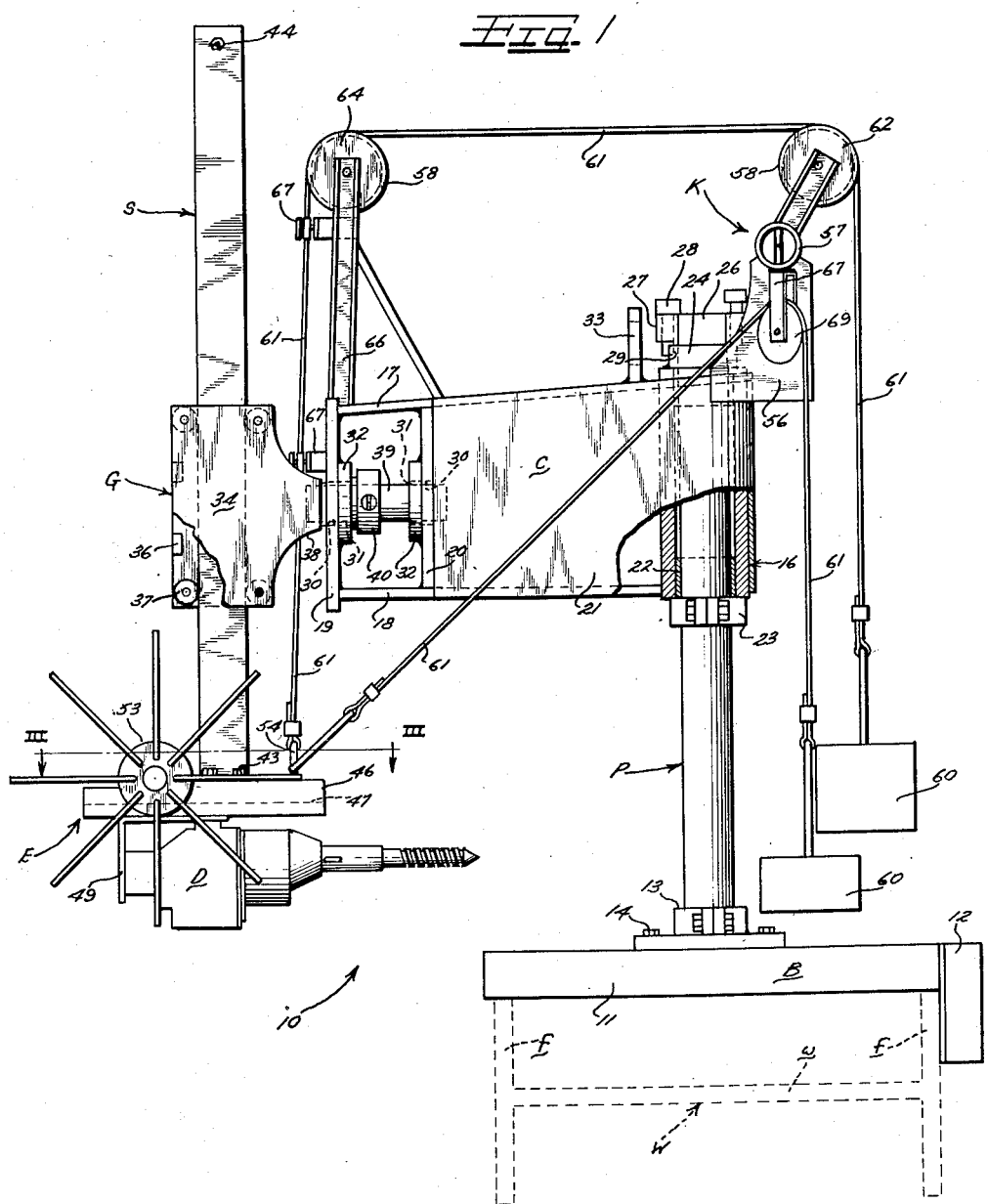
Inventor
OLLICE C. ROBBINS Jan. 13, 1959 O. C. ROBBINS 2,868,043
PORTABLE HORIZONTAL DRILL
Filed May 20, 1957 2 Sheets-Sheet 2
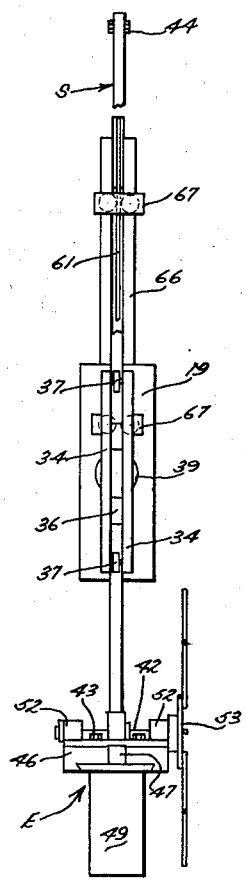
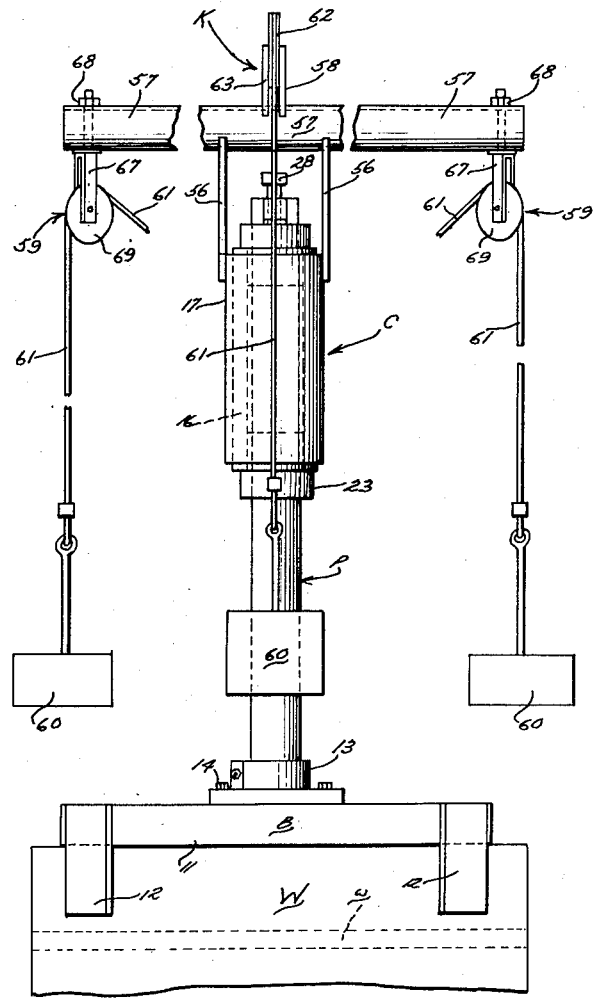
Inventor
OLLICE C. ROBBINS

United States Patent Office 2,868,043
Patented Jan. 13, 1959

2,868,043

PORTABLE HORIZONTAL DRILL

Ollice C. Robbins, Munster, Ind.

Application May 20, 1957, Serial No. 660,293

8 Claims. (Cl. 77—7)

The present invention relates to a drill assembly, and more particularly relates to a portable drill assembly that is adapted to be supported on a workpiece or adjacent thereto and having the drill portion of the assembly free floating or counterbalanced so as to be easily translatable to a desired work station with a minimum of effort on the part of an operator.

In the past, the various types of heavy duty drilling machines used to drill large castings or heavy structural elements, such as I-beams, were either large, stationary machines, that necessitated bringing the workpiece to the machine, or if portable, were bulky, unwieldy and fatiguing in use to the operator. In addition, due to the rigidity of heavy duty drilling machines of this type, an operator was apt to misalign the drill with the hole, with a resulting inaccurate hole size or location, particularly during a reaming operation.

The present invention offers one solution to this problem in the form of an improved floating, self-aligning, portable drill assembly, that is adapted for drilling holes in the flanges or webs of long, heavy duty structural members, such as I-beams, to facilitate installation and assembly of the members at their point of utilization. To this end, provision is made for mounting the drill assembly on the member to be drilled, or on a movable base such as a vehicle, thereby permitting the drill assembly to be readily translated to any desired work station on or adjacent to the workpiece. A counterbalancing system is utilized to render the drill free floating, thereby to provide the self-aligning feature of the invention, as well as to reduce the amount of effort required on the part of an operator to move the drill into position when one or more holes are to be drilled at a particular work station.

Briefly described, the present invention contemplates a drill assembly having a generally flattened platform, or base, that is adapted to be mounted on the member or workpiece to be drilled, or on a vehicle to render the drill portable. An upstanding post is mounted on the base and a carriage is mounted on the post which may be raised or lowered or swung through a 360° angle. A guide assembly is pivotally mounted on the carriage to slidably receive a support bar therethrough for movement in a vertical plane. A drill carriage assembly and horizontally reciprocable drill are connected to one end of the support bar for sliding reciprocable movement in the guide assembly. The guide assembly for the support bar thus accommodates movement of the drill carriage assembly and drill in a vertical plane to provide a pendulum action, but prevents pivotal movement thereof about a horizontal axis.

A counterbalancing system is also provided to render the drill carriage assembly and drill free floating, thereby providing the self-aligning feature of the invention as well as to facilitate movement of the drill throughout a wide range of operating positions at a particular work station on the member or workpiece. A lifting hook or eye is also provided on the carriage to facilitate translating the drill assembly to its various operating positions on the workpiece or to a storage location.

It is an object then of the present invention to provide an improved drill assembly.

Another object of the present invention is to provide an improved portable drill assembly that is adapted to be mounted on the workpiece or on a vehicle for movement into drilling position adjacent the workpiece, and in which the drill portion of the assembly is easily movable throughout a wide range of operating positions thereon by an operator.

A further object of the present invention is to provide an improved heavy duty portable drill assembly that is adapted to be mounted on a workpiece and in which counterbalancing is employed to render the drill portion of the assembly free-floating, thereby permitting the drill to adjust itself to a particular hole location and inclination, regardless of its operating position at a particular work station.

Still another object of the present invention is to provide an improved portable drill assembly that is particularly adapted for use in drilling heavy industrial castings or structural members, wherein the drill assembly is supported on a vehicle, such that the drill assembly can be readily moved to any desired position along the workpiece or adjacent thereto, when mounted on the vehicle.

A further object of the present invention is to provide an improved portable drill assembly for drilling heavy castings and structural members, wherein a free-floating pendulum mount for the drill portion of the assembly permits movement of the drill in vertical plane adjacent the workpiece, and in which a rack and pinion are utilized to advance or return the drill into its operating position on the workpiece.

Still another object of the present invention is to provide an improved drill assembly for drilling large castings and structural members that is simple to operate, economical to manufacture, and easy to maintain and service.

Many other objects and advantages of the invention will become manifest to those versed in the art upon making reference to the detailed description that follows and the accompanying sheets of drawings wherein like reference numerals and letters are used to identify identical parts.

In the drawings:

Figure 1 is a reduced side elevational view, with parts broken away to show underlying parts, of a drill assembly constructed according to the principles of my invention;

Figure 2 is a front elevational view, with some parts removed to show underlying parts, of the drill assembly of Figure 1;

Figure 3 is a top plan view, taken substantially along the lines III—III of Figure 1; and Figure 4 is a broken rear elevational view of my invention, showing the arrangement and mounting for the counterbalancing system thereof.

As shown on the drawings:

In Figures 1 and 4, the drill assembly of the invention is designated generally by the reference numeral 10, and includes a base B, a post P, a carriage assembly C, a support bar S, a drill carriage assembly E, a drill D, and a counterbalancing system K. Also shown in Figures 1 and 4, is a typical workpiece W, which may be a large casting or structural element, and for the purposes of describing the invention has been illustrated as an I-beam having a web portion $w$ and flanged portions $f$.

The base B generally includes a reenforced flat plate, or platform portion 11, and a pair of retaining flanges 12, that are secured to the platform portion 11 along the edge thereof by suitable fasteners (not shown) or by welding. The retaining flanges 12 overlie a vertical side of the workpiece and thus serve to prevent the drill assembly 10 from shifting on the workpiece during a drilling operation, though under some conditions the retaining flanges 12 can be eliminated.

The post P is generally centrally mounted on the base B by a flanged mounting collar 13, that is connected to the base B by fasteners 14. The post P may be formed with a tubular or solid cross-section of a sufficient diameter to resist the stresses and bending moments imposed by the carriage assembly C during a drilling operation, and with an axial length sufficient to provide a desired range of travel of the carriage assembly C.

The post P may be permanently mounted on the base B, but as illustrated in Figures 1 and 4, is removably secured to the base B by the adjustable mounting collar 13.

The carriage assembly C generally includes a tubular sleeve portion 16 that engages the post P, a spaced pair of generally horizontally arranged upper and lower plates 17 and 18 respectively, a pair of generally vertically arranged outer and inner end plates 19 and 20 respectively, and a pair of enclosing side plates 21, that may be formed from a single sheet and wrapped around the sleeve portion 16.

The top and bottom plates 17 and 18 may be suitably bored to receive the tubular sleeve 16, and thereafter secured thereto by conventional fastening techniques, such as welding. The side plates 21 may similarly be fastened to the spaced top and bottom plates 17 and 18, and inner end plate 20 by conventional fastening techniques to provide a generally box-like cross-sectional configuration to the carriage assembly C, which is extremely rigid as well as being light in weight.

As illustrated in Figure 1, the side plates 21 are preferably formed from a single sheet of material that is wrapped around the tubular sleeve 16, but it should be understood that separate side plates could be used in the construction of the carriage assembly C, if desired.

The tubular sleeve 16 is formed with an internal diameter somewhat larger than the external diameter of the post P, to accommodate the insertion of a pair of bushings 22 at its end extremities, which form journals for pivotal movement of the carriage assembly C on the post P. The sleeve 16 includes a lower clamp ring 23 for locking the carriage assembly C on the post P at some point of adjustment, an upper ring 24 and an indexing cap assembly 26.

The indexing cap assembly 26 includes a boss portion 27 that is suitably axially bored to receive a removable locking pin 28. The upper ring 24 is complementally bored or recessed as at 29 at one or more index points around the circumference of the upper ring 24 to permit indexing of the carriage assembly C in relation to the base B. It should be understood however that more than one index bore or recess 29 could be provided in the upper ring 24 to permit a plurality of drilling angles by the drill D in relation to the workpiece W.

Thus it will be appreciated that the tubular sleeve 16 and clamp ring 23 provides a pivotal mounting for the carriage assembly C on the post P, at any desired height, and the upper ring 24 and indexing cap assembly 26 permit a locked indexing of the carriage assembly C in relation to the base B, as determined by the number and position of index bores or recesses 29 in the upper ring 24, into which the locking pin 28 may be selectively inserted.

The end plates 19 and 20, are fastened to the top and bottom plates 17 and 18 and are centrally axially bored as at 30 to receive a pair of bushings 31, that are retained in the bores 30 by a pair of washers 32 secured to the end plates 19 and 20. The washers 32, and end plates 19 and 20, have internal diameters substantially equal to the external diameter of the bushings 31 to permit a press fitted assembly thereof. The bushings 31 in the end plates 19 and 20 together form aligned bearing surfaces for pivotally mounting the guide assembly G on the carriage C, as will be explained in more detail as the description proceeds.

The carriage assembly C also includes a lifting ring or eye 33 that is secured to the top plate 17, substantially at the center of gravity of the drill assembly 10, to provide a lifting point for moving the drill assembly 10 to its various work stations on the workpiece W, or to a storage position.

Referring now to Figure 2 in conjunction with Figure 1, the guide assembly G includes a pair of generally rectangular plates 34 that are maintained in spaced relationship by spacing blocks 36, which are fastened between the plates 34 to form a rigid assembly. A plurality of rollers 37 are also provided between the spaced plates 34, which are preferably positioned at the corners of the plates and so arranged as to define a track or guide path for the support bar S therethrough.

It should be understood however, that more or less than the illustrated number of rollers in Figure 1, could be used between the plates 34 of the guide assembly G, and that in some applications other suitable track forming structure could be used, as for example positioning posts or guide bars.

In order to provide the pivotal mounting of the guide assembly G to the carriage assembly C, the plates 34 are formed with one of their vertical edge portions extending laterally as a tapered projection or boss 38 (Figure 1), to which is attached a stub shaft 39 having an outside diameter substantially equal to the inner diameter of the bushings 31 to permit its journalled engagement therein. The stub shaft 39 may be connected to the boss portions 38 of the plates 34 in any desired manner, but preferably has its guide assembly engaging end flattened to facilitate its insertion between the boss portions 38 and a subsequent welding together of these members. An adjustable clamp ring 40 and a thrust washer 41 are provided to retain the stub shaft 39 journaled in the bushings 31 and to accommodate the bending moments imposed on the end plates 20 and 21 of the carriage assembly C by the guide assembly G, respectively.

Thus the stub shaft 39 provides a pivotal mounting for the guide assembly G in a vertical plane, while the thrust washer 41 and bushing retaining washers 32 prevent pivotal movement of the guide assembly G about a horizontal axis when connected to the carriage assembly C.

The support bar S may be formed with any desired length and cross-sectional configuration, but preferably is formed as an elongated bar, having a rectangular cross-section and length sufficient to provide a suitable range of vertical travel for the drill carriage assembly E when mounted in the guide assembly G. To facilitate attachment of the support bar S to the drill carriage assembly E, an end plate 42 may be connected at the end thereof to provide flanged mounting portions that facilitate connection of the drill carriage assembly E, as by fasteners 43. A stop screw or bolt 44 may also be provided at the upper end of the support bar S to prevent its unintended disengagement from the guide assembly G.

Referring now to Figure 3 in conjunction with Figures 1 and 2, the drill carriage assembly E generally includes a bed 46, a slidable rack 47, a pinion 48 engaged with the rack 47, and a mounting bracket 49, to which the drill D is connected.

As best shown in Figures 1 and 2, the bed 46 is grooved to slidably receive the rack 47 in its bottom portion. A tongue and groove joint is preferably used to slidably mount the rack 47 in the bed 46, though it should be understood that any other suitable type of sliding juncture could be used instead.

The bed 46 is also formed with a rectangular recess or aperture 50 in its upper surface, which extends through the bed and exposes the teeth on the rack 47 therebelow. The pinion 48 is mounted on a shaft 51 that is supported in journals 52 above the aperture 50, which maintain the pinion 48 in meshed engagement with the rack 47. The shaft 51 extends laterally beyond the bed 46 and is provided with a spoked wheel assembly 53 for applying rotative torque to the pinion 48 to advance the rack 47 and connected drill D along the bed 46 during a drilling operation. The bed 46 also includes a ring or eye bolt 54 which provides an attachment point for a counter balancing assembly K to the drill carriage assembly E, as will be described in more detail later.

It should be understood that any other suitable force multiplying system having a sufficient mechanical advantage to advance the drill assembly D through the work W could be utilized in place of the spoked wheel assembly 53, as for example a ratchet lever system, or the like. It should also be understood that any other drive train could be utilized to move the drill D along the bed 46, in place of the rack and pinion drive illustrated in Figures 1–3, as for example a worm gear drive or the like.

The bracket 49 may be permanently attached to the rack 47 by any convenient fastening technique, preferably welding, and the drill D may similarly be attached to the bracket 49 by conventional fastening techniques, preferably by removable fasteners to facilitate servicing and maintenance.

The drill D may be any of the commercially available types having a sufficient size, rating and capacity for the particular operating conditions to be encountered and is preferably of the electrically driven type.

As best shown in Figures 1 and 4, the counterbalancing system K of the drill assembly 10 generally includes a pair of support or mounting plates 56, that are attached to the carriage assembly C adjacent its sleeve portion 16, a horizontally extending beam 57, that is supported by the plates 56 and attached thereto, a central pulley assembly 58, a pair of spaced pulley assemblies 59, carried at the end extremities of the beam 57, and a plurality of counterweights 60, which are connected to the ring or eye bolt 54 (Figure 1) on the drill carriage assembly E by cables 61 that pass through the pulley assemblies 58 and 59, respectively.

As shown in Figures 1 and 4, the beam 57 has a generally tubular configuration, but it should be understood that any other desired cross-sectional shape could be utilized instead, as for example an I-beam or box, so long as the beam has sufficient rigidity to resist excessive bending from the drill carriage assembly E and counterweights 60.

The central pulley assembly 58 generally includes a beam mounted pulley 62 that is supported on the beam 57 by a bracket 63, a carriage mounted pulley 64, that is supported by a bracket assembly 66 on the end of the carriage assembly C, adjacent the guide assembly G, and a plurality of roller guides 67, which serve to maintain the cable 61 between the plates 34 of the guide assembly G in free running relationship without chafing, and also maintain linear alignment between the attached connection of the cable 61 with the eye bolt 54 and the pulley 64.

The spaced pulley assemblies 59 generally include a swivelling, bifurcated bracket 67 that is fastened to the end extremities of the beam 57 by suitable fasteners 68. The swivelling brackets 67 thus accommodate changes in angular relationship of the cable 61 between the eye bolt 54 and pulleys 69, when the drill carriage assembly E is moved laterally from some reference position in relation to the base B.

The counterweights 60 are connected at the free ends of the cable 61 and are selected so as to substantially counterbalance the combined weights of the drill D, drill carriage assembly E, and support bar S. The counterbalancing assembly K will thus serve to render the drill D and its supporting members substantially weightless and permit the drill to be readily moved by an operator into a plurality of positions on the workpiece W with a minimum of effort.

It should be understood however that any other suitable counterbalancing system could be used in place of the counterweights 60, as for example a commercially available self-tensioning pulley system, having the proper rating to counterbalance the weight of the drill D and its supporting members throughout its full range of movement.

Thus it will be appreciated that the combined interaction of the central pulley system 58, divided pulley system 59 and counterweights 60, of the counterbalancing system K, together with the reciprocable movement of the support bar S in the guide assembly G, provide a self-adjusting pendulum action which permits an operator to easily move the drill assembly D throughout a wide range of drilling positions adjacent the workpiece W without having to support the weight of these components during a drilling operation.

It should also be understood that the drill assembly 10 could be mounted on a vehicle, such as the platform portion or bed of a truck, and moved into position adjacent the workpiece for a drilling operation where the configuration or location of the workpiece will not permit the drill assembly to be mounted thereon.

In operation, the drill assembly 10 is placed on the workpiece W so that its base portion B is centrally positioned on the workpiece and the retaining flanges 12 are in abutting engagement with a side portion of the workpiece. The carriage assembly C is then adjusted to a desired vertical height on the post P and locked in position by adjustment of the lower clamp ring 23. During this initial set-up period, the lock pin 28 may be inserted in the indexing bore or recess 29 in the upper ring 24, to orient the carriage C and drill D with the workpiece W. After the number and position of the holes to be drilled has been determined the drill assembly E and drill D are moved into position adjacent the workpiece W. The drill D is advanced into cutting engagement with the workpiece W by manipulation of the spoked wheel assembly 53 which rotates the pinion 48 and slides the rack 47 and attached drill D in the bed 46. The relatively long lengths of the beam 57 and support bar S permits the drill D to be moved throughout a wide range of drilling positions adjacent the workpiece W without the necessity of moving the entire base portion B of the assembly to a new work station.

While only one embodiment of the invention has been herein illustrated and described, it should be understood that various modifications and variations may be effected without departing from the scope of the novel concepts herein disclosed.

I claim as my invention:

1. A drill assembly comprising a base adapted to be mounted upon a workpiece or vehicle, an upstanding post mounted on said base, a carriage slidably mounted on said post and rotatably adjustable for 360° therearound, pivotally mounted guide means carried by said carriage, a support bar slidably mounted in said guide, and a drill mounted on said support bar for selected reciprocal movement toward said post, whereby said drill may be swung into a plurality of operating positions in relation to said work piece.

2. A drill assembly comprising a base adapted to be mounted on an associated workpiece, an upstanding post mounted on said base, a carriage slidably mounted on said post, guide means mounted on said carriage for movement in a vertical plane, a support bar slidably mounted in said guide means, a drill carriage assembly connected to said support bar, a drill carried by said drill carriage assembly for movement in a plane perpendicular to said post and to the plane of movement of said guide means, a laterally extending support member mounted on said carriage, and counterbalancing means connected to said support member and said drill carriage assembly operable to render said drill carriage assembly substantially weightless, whereby said drill carriage assembly and drill may be easily moved into a desired operating position in relation to an associated workpiece.

3. The drill assembly defined in claim 2 wherein the counterbalancing means includes a plurality of pulleys carried by said laterally extending support member and said carriage, cables passing around said pulleys and connected to said drill carriage assembly, and a plurality of selected weights attached to the free ends of said cables to substantially counterbalance the weight of said drill and drill carriage assembly.

4. The drill assembly defined in claim 2 wherein the guide means comprise a pair of spaced generally rectangular plates having a plurality of rollers therebetween defining a track to slidably guide the support bar therein.

5. The drill assembly defined in claim 2 wherein the drill carriage assembly includes a bed, a slidable rack carried by the bed, said drill being carried by said rack in depending relation thereto, a pinion mounted on the bed and engageable with the rack, and a sprocket wheel assembly for rotating the pinion for advancing or returning the rack and drill along the bed.

6. A drill assembly adapted to be mounted on an associated workpiece comprising a base having a retaining flange engageable with said workpiece to prevent said drill assembly from sliding thereon, an upstanding post mounted on said base, a carriage slidably mounted on said post, a pair of spaced plates having rollers defining a track therebetween pivotally mounted on said carriage for movement in a vertical plane, a support bar reciprocably movable in said track, a drill carriage assembly including a bed, a rack slidable in said bed, and a pinion engageable with said rack connected to said support bar, a drill connected to said rack and reciprocably movable toward said work piece in a plane perpendicular to the plane of movement of said guide plates by rotation of said pinion, a horizontally disposed beam centrally mounted on said carriage and extending on either side thereof, pulleys mounted on said beam, a plurality of cables attached to the bed of said drill carriage assembly passing around said pulleys, and a plurality of selectively variable weights attached to the free ends of said cables to substantially counterbalance the weight of said drill, said drill carriage assembly and said support bar, whereby said drill carriage assembly and drill may be easily moved into a desired operating position in relation to an associated workpiece.

7. A drill assembly adapted to be mounted on an associated work piece comprising a base, an upstanding post mounted on said base, a carriage slidably mounted on said post for full pivotal movement therearound, a pair of spaced plates having rollers defining a track therebetween pivotally mounted on said carriage for movement in a vertical plane, a support bar reciprocably movable in said track, a drill carriage assembly carried by said support bar and a drill mounted in said drill carriage assembly for movement in a plane perpendicular to said support bar and to the plane of movement of said guide plates.

8. A drill assembly adapted to be mounted on an associated work piece comprising a base, an upstanding post mounted on said base, a carriage slidably mounted on said post, guide means pivotally mounted on said carriage for movement in a vertical plane, a support bar reciprocably movable in said guide means, a drill carriage assembly carried by said support bar, a drill mounted in said drill carriage assembly for reciprocable movement towards said work piece in a plane perpendicular to the plane of movement of said guide means, a horizontally disposed beam centrally mounted on said carriage and extending on either side thereof, pulleys mounted on said beam, a plurality of cables attached to the bed of said drill carriage assembly and passing around said pulleys, and a plurality of selectively variable weights attached to the free ends of said cables to substantially counterbalance the weight of said drill carriage assembly and said support bar, whereby said drill carriage assembly may be easily moved into a desired operating position in relation to said work piece.

References Cited in the file of this patent

UNITED STATES PATENTS

| | | |
|---|---|---|
| 397,311 | Schoff | Feb. 5, 1889 |
| 596,375 | Murchie | Dec. 28, 1897 |
| 1,117,917 | Schoenky | Nov. 17, 1914 |
| 1,761,663 | Gray | June 3, 1930 |
| 1,922,532 | Ehlen | Aug. 15, 1933 |
| 2,002,727 | Andren | May 28, 1935 |
| 2,291,999 | Wilson et al. | Aug. 4, 1942 |
| 2,417,247 | Fuller | Mar. 17, 1947 |
| 2,587,520 | Peplow | Feb. 26, 1952 |